US012175917B1

(12) United States Patent
He et al.

(10) Patent No.: US 12,175,917 B1
(45) Date of Patent: Dec. 24, 2024

(54) GATE DRIVE CIRCUIT AND DISPLAY PANEL

(71) Applicant: TCL China Star Optoelectronics Technology Co., Ltd., Guangdong (CN)

(72) Inventors: Song He, Guangdong (CN); Xiaojin He, Guangdong (CN); Xu Wang, Guangdong (CN); Zelin Yang, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/398,476

(22) Filed: Dec. 28, 2023

(30) Foreign Application Priority Data

Dec. 14, 2023 (CN) ......................... 202311725764.2

(51) Int. Cl.
*G09G 3/3266* (2016.01)
*G09G 3/20* (2006.01)

(52) U.S. Cl.
CPC ... *G09G 3/2092* (2013.01); *G09G 2310/0267* (2013.01)

(58) Field of Classification Search
CPC ......... G09G 2310/0267; G09G 3/2092; G09G 2310/0286; G09G 3/3266; G09G 3/3674
See application file for complete search history.

(56) References Cited

U.S. PATENT DOCUMENTS

2019/0221181 A1* 7/2019 Li .......................... G11C 19/28
2020/0320937 A1* 10/2020 Yang .................... G09G 3/3258
2023/0162686 A1* 5/2023 Feng .................... G09G 3/3266 345/204

* cited by examiner

*Primary Examiner* — Dennis P Joseph

(57) ABSTRACT

A gate drive circuit and a display panel. The gate drive circuit includes multi-stage cascaded gate drive units. The gate drive units each include a pull-up control module, an output module, a pull-down module, a pull-down maintain module, a first reference low-level signal input terminal, a second reference low-level signal input terminal, and a pull-up node located in a line between the pull-up control module and the output module. The pull-up control module includes a pull-up control transistor that is electrically connected to the pull-up node and configured to pull a potential of the pull-up node up. The output module includes a scan signal output transistor that is electrically connected to the pull-up node and configured to output a present-stage scan signal under control of the potential of the pull-up node.

20 Claims, 6 Drawing Sheets

GATE DRIVE CIRCUIT AND DISPLAY PANEL

CROSS-REFERENCE TO RELATED APPLICATION

This application claims the benefit of priority of Chinese Patent Application No. 202311725764.2, filed on Dec. 14, 2023, the contents of which are incorporated by reference as if fully set forth herein in their entirety.

TECHNICAL FIELD

The present disclosure relates to the field of display technologies, and more particularly, to a gate drive circuit and a display panel.

BACKGROUND

A Gate-driver On Array (GOA) technique is a technique for fabricating a gate drive circuit on a thin film transistor array substrate by using a process of a thin film transistor array, so as to realize a driving mode of progressive scanning. The gate drive circuit includes multi-stage cascaded gate drive units.

The transistors in the existing gate drive unit are prone to a parasitic capacitance or the like, thereby affecting the potential of the pull-up node, and resulting in poor stability of the existing gate drive circuit.

SUMMARY

In one aspect, an embodiment of the present disclosure provides a gate drive circuit, where the gate drive circuit includes multi-stage cascaded gate drive units, each gate drive unit includes a pull-up control module, an output module, a pull-down module, a pull-down maintain module, a first reference low-level signal input terminal, a second reference low-level signal input terminal, and a pull-up node located on a line between the pull-up control module and the output module; the pull-up control module includes a pull-up control transistor, the pull-up control transistor is electrically connected to the pull-up node, and the pull-up control transistor is configured to pull a potential of the pull-up node up; the output module includes a scan signal output transistor, the scan signal output transistor is electrically connected to the pull-up node, the scan signal output transistor is configured to output a present-stage scan signal under control of the potential of the pull-up node; the pull-down module is electrically connected to the pull-up node, the first reference low-level signal input terminal, and the pull-up maintain module, and the pull-down module is configured to pull the potential of the pull-up node down to a potential of a first reference low-level signal inputted by the first reference low-level signal input terminal; the pull-down maintain module is electrically connected to the pull-up node and the second reference low-level signal input terminal, the pull-down maintain module is configured to maintain the potential of the pull-up node at a potential of a second reference low-level signal inputted by the second reference low-level signal input terminal; and where a ratio of a channel length of the pull-up control transistor to a channel length of the scan signal output transistor is between 1:8 and 1:12.

In another aspect, the present disclosure provides a display panel including a plurality of pixel cells and a gate drive circuit, the gate drive circuit being electrically connected to the plurality of pixel cells, where the gate drive circuit includes multi-stage cascaded gate drive units, each gate drive unit includes a pull-up control module, an output module, a pull-down module, a pull-down maintain module, a first reference low-level signal input terminal, a second reference low-level signal input terminal, and a pull-up node located on a line between the pull-up control module and the output module; the pull-up control module includes a pull-up control transistor, the pull-up control transistor is electrically connected to the pull-up node, and the pull-up control transistor is configured to pull a potential of the pull-up node up; the output module includes a scan signal output transistor, the scan signal output transistor is electrically connected to the pull-up node, the scan signal output transistor is configured to output a present-stage scan signal under control of the potential of the pull-up node; the pull-down module is electrically connected to the pull-up node, the first reference low-level signal input terminal, and the pull-up maintain module, and the pull-down module is configured to pull the potential of the pull-up node down to a potential of a first reference low-level signal inputted by the first reference low-level signal input terminal; the pull-down maintain module is electrically connected to the pull-up node and the second reference low-level signal input terminal, the pull-down maintain module is configured to maintain the potential of the pull-up node at a potential of a second reference low-level signal inputted by the second reference low-level signal input terminal; and where a ratio of a channel length of the pull-up control transistor to a channel length of the scan signal output transistor is between 1:8 and 1:12.

DETAILED DESCRIPTION

Figure 1:
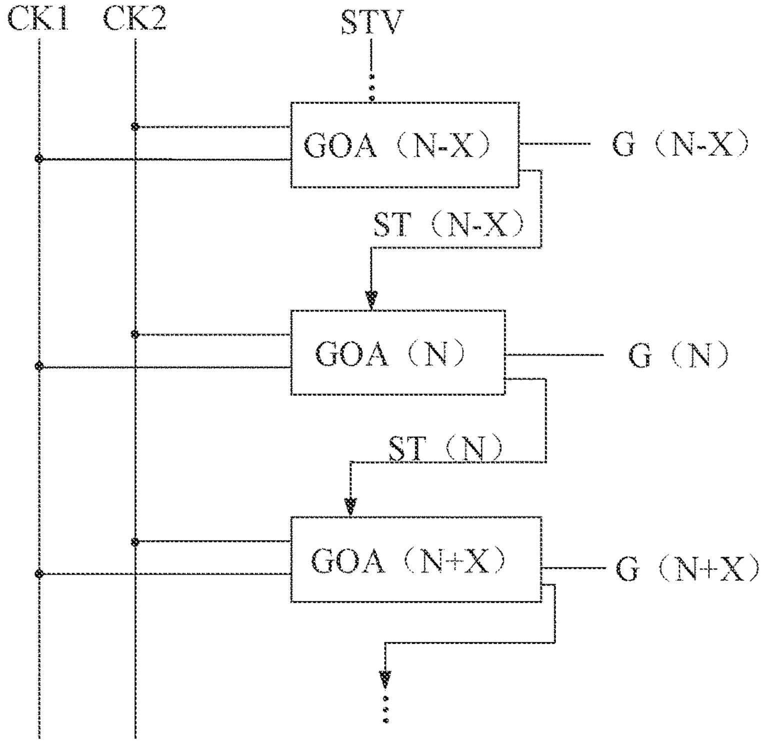
FIG. 1 is a schematic diagram of a gate drive circuit according to the present disclosure.

The technical solution in the embodiments of the present disclosure will be described below in connection with the accompanying drawings in the embodiments of the present disclosure. The described technical solution is for the purpose of explanation and description of the idea of the present disclosure only, and should not be construed as limiting the scope of protection of the present disclosure.

The various embodiments provided herein are similar, and features in different embodiments may be combined with each other.

An embodiment of the present disclosure provides a display panel including a plurality of pixel cells and at least one gate drive circuit, the gate drive circuit being electrically connected to the plurality of pixel cells.

Specifically, the display panel includes a plurality of pixel cells arranged in an array and a plurality of scan lines. Each scan line is electrically connected to a row of pixel cells. The gate drive circuit includes multi-stage cascaded gate drive units. Each gate drive unit (i.e., each stage of the gate drive units) is electrically connected to at least one scan line, and is configured to supply scan signals to the corresponding scan line to control the thin film transistors in the pixel cells of the corresponding row to be turned on or turned off.

The gate drive unit includes at least one pull-up control transistor, at least one scan signal output transistor, at least one pull-down transistor, at least one pull-down maintain transistor, and a pull-up node on a line between the pull-up control transistor and the scan signal output transistor. Herein, the pull-up control transistor is electrically connected to the pull-up node, and the pull-up control transistor is configured to pull a potential of the pull-up node up. The scan signal output transistor is electrically connected to the pull-up node, and the scan signal output transistor is configured to output a present-stage scan signal under the control of the potential of the pull-up node. The pull-down transistor is electrically connected to the pull-up node and is configured to pull the potential of the pull-up node down. The pull-down maintain transistor is electrically connected to the pull-up node and is configured to keep the potential of the pull-up node low. Herein, a ratio of a channel length of the pull-up control transistor to a channel length of a scan signal output transistor is between 1:8 and 1:12.

Herein, a channel width of the pull-up control transistor is equal to a channel width of the scan signal output transistor.

In the embodiments of the present disclosure, there are one or more pull-up control transistors, one or more scan signal output transistors, one or more pull-down transistor, and one or more pull-down maintain transistors respectively for which the skilled person may make selections based on actual needs, and the number of the transistors is not specifically limited in the present disclosure.

A gate drive circuit in a display panel according to an embodiment of the present disclosure is provided such that a ratio of a channel length of a pull-up control transistor to a channel length of a scan signal output transistor is set to be between 1:8 and 1:12, so that a potential of a pull-up node, a time required for switching a scan signal from a high potential to a low potential, a charging rate of pixels, and a capacitance and resistance values in a gate drive unit are all in optimal intervals, thereby improving stability of the gate drive circuit.

The transistors employed in all embodiments of the present disclosure may be thin film transistors or other devices having the same characteristics. To distinguish between the two electrodes of a transistor except the gate, one of the source and the drain is referred to as a first electrode, and the other of the source and the drain is referred to as a second electrode. According to the configuration in the drawings, a middle input terminal of a transistor is the gate, a signal input terminal is the first electrode, and the signal output terminal is the second electrode. The transistor used in the embodiments of the present disclosure is a P-type transistor or an N-type transistor, where the P-type transistor is turned on when the potential of the gate is low and is turned off when the potential of the gate is high; the N-type transistor is turned on when the potential of the gate is high and is turned off when the potential of the gate is low.

As shown in FIG. 1, an embodiment of the present disclosure provides a gate drive circuit including multi-stage cascaded gate drive units. FIG. 1 is an example of cascaded (N−X)th gate drive unit GOA (N−X) (i.e., (N−X)th stage gate drive unit GOA (N−X)), Nth gate drive unit GOA (N) (i.e., Nth stage gate drive unit GOA (N)), and (N+X)th gate drive unit GOA (N+X) (i.e., (N+X)th stage gate drive unit GOA (N+X)).

Specifically, the (N−X)th gate drive unit GOA (N−X), the Nth gate drive unit GOA (N), and the (N+X)th gate drive unit GOA (N+X) are connected to the scan lines G (N−X), G(N), and G (N+X), respectively, where the gate of at least one pull-down transistor of the Nth gate drive unit GOA (N) is electrically connected to the pull-up node of the (N−X)th gate drive unit GOA (N−X), and the gate of at least one pull-down transistor of the (N+X)th gate drive unit GOA (N+X) is electrically connected to the pull-up node of the Nth gate drive unit GOA (N), and so on. Meanwhile, the (N−X)th gate drive unit GOA (N−X) transmits the scan signal to the scan line G (N−X) connected to the (N−X)th gate drive unit GOA (N−X), the Nth gate drive unit GOA (N) transmits the scan signal to the scan line G(N) connected to the Nth gate drive unit GOA (N), the (N+X)th gate drive unit GOA (N+X) transmits the scan signal to the scan line G (N+X) connected to the (N+X)th gate drive unit GOA (N+X), and so on. Herein, the values of X and Y may be equal or not equal. X and Y are both positive integers greater than 1, preferably X and Y are both 2.

Herein, the first stage gate drive unit transmits a scan signal to the first scan line connected to the first stage gate drive unit in response to the start signal STV. It should be noted that the Nth stage gate drive unit (N is a positive integer greater than 1) may transmit the scan signal to the Nth scan line G(N).

Specifically, the scan drive control signal input terminal includes a first first clock signal input terminal CK1 and a second first clock signal input terminal CK2.

When the Nth stage gate drive unit operates, the scan signal output by the Nth stage gate drive unit GOA (N) is at a high potential for turning on the transistor switch of each pixel in a row in the display panel and charging the pixel electrode in each pixel by the data signal.

Figure 2:
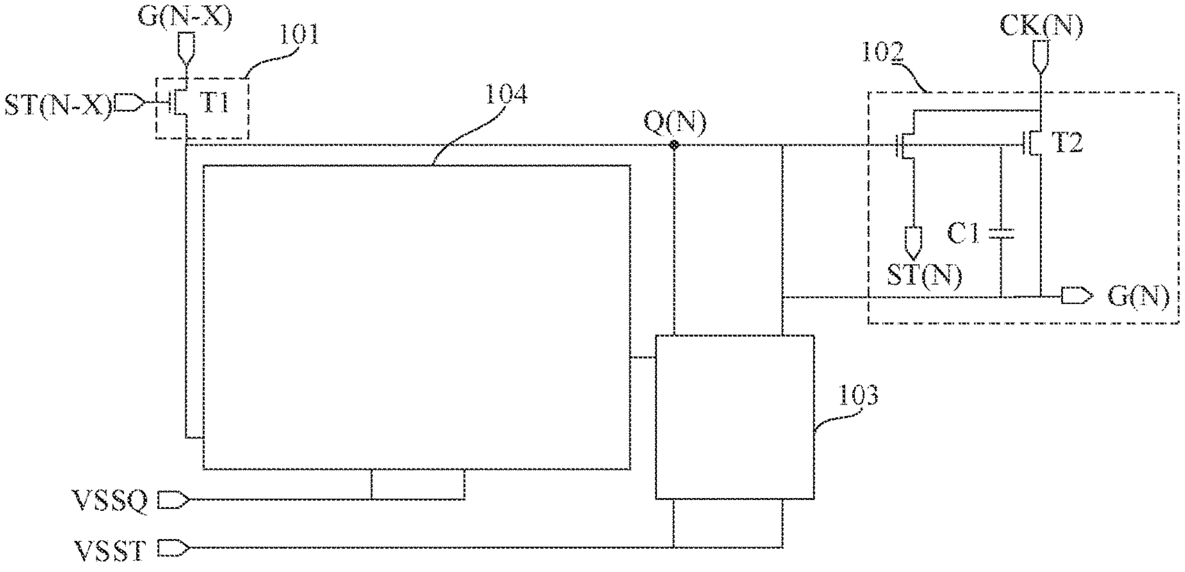
FIG. 2 is a circuit diagram showing a pull-up control module and an output module of the gate drive unit provided in FIG. 1.

As shown in FIG. 2, an embodiment of the present disclosure provides a gate drive circuit including multi-stage cascaded gate drive units each including a pull-up control module 101, an output module 102, a pull-down module 103, a pull-down maintain module 104, a first reference low-level signal input terminal VSST, a second reference low-level signal input terminal VSSQ, and a pull-up node Q(N) located on a line between the pull-up control module 101 and the output module 102.

The pull-up control module 101 includes a pull-up control transistor T1 electrically connected to the pull-up node Q(N), which is configured to pull the potential of the pull-up node Q(N) up. Specifically, the gate of the pull-up control transistor T1 is electrically connected to the pre-Xth-stage stage-transmission signal output terminal ST (N−X) (where the pre-Xth-stage represents a stage that is X stages ahead of the Nth-stage), the first electrode of the pull-up control transistor T1 is electrically connected to one of the reference high-level input terminal VGH (not shown), the pre-Xth-stage scan signal output terminal G (N−X), and the pre-Xth-stage stage-transmission signal output terminal ST (N−X), and the second electrode of the pull-up control transistor T1 is electrically connected to the pull-up node Q(N). The pull-up control transistor T1 pulls up the potential of the pull-up node Q(N) under the control of the pre-Xth-stage stage-transmission signal inputted by the pre-Xth-stage stage-transmission signal output terminal ST (N−X), where X is a positive integer greater than or equal to 1.

The output module 102 includes a scan signal output transistor T2 electrically connected to the pull-up node Q(N), and the scan signal output transistor T2 is configured to output the present-stage scan signal under the control of the potential of the pull-up node Q(N). Specifically, the gate of the scan signal output transistor T2 is electrically connected to the pull-up node Q(N), the first electrode of the scan signal output transistor T2 is electrically connected to the second clock signal input terminal CK(N), the second electrode of the scan signal output transistor T2 is electrically connected to the present-stage scan signal output terminal G(N), and the scan signal output transistor T2 is configured to output the present-stage scan signal through the present-stage scan signal output terminal G(N) under the control of the potential of the pull-up node Q(N).

The output module 102 further includes a stage-transmission signal output transistor T3, the gate of which is electrically connected to the pull-up node Q(N), the first electrode of which is electrically connected to the second clock signal input terminal CK(N), the second electrode of which is electrically connected to the present-stage stage-transmission signal output terminal ST(N), and the stage-transmission signal output transistor T3 being configured to output the present-stage stage-transmission signal through the present-stage stage-transmission signal output terminal ST(N) under the control of the potential of the pull-up node Q(N).

The output module 102 further includes a first capacitor C1, the first plate of which is electrically connected to the pull-up node Q(N), the second plate of which is electrically connected to the present-stage scan signal output terminal G(N), and the first capacitor C1 being configured to stabilize the potential of the first node.

The pull-down module 103 is electrically connected to the pull-up node Q(N), the first reference low-level signal input terminal VSST, and the pull-down maintain module 104, and the pull-down module 103 being configured to pull the potential of the pull-up node Q(N) down to the potential of the first reference low-level signal inputted by the first reference low-level signal input terminal VSST.

The pull-down maintain module 104 is electrically connected to the pull-up node Q(N) and the second reference low-level signal input terminal VSSQ, and is configured to maintain the potential of the pull-up node Q(N) at the potential of the second reference low-level signal inputted by the second reference low-level signal input terminal VSSQ. Herein, a ratio of a channel length of the pull-up control transistor T1 to a channel length of the scan signal output transistor T2 is between 1:8 and 1:12.

Herein, the channel width of the pull-up control transistor T1 is equal to the channel width of the scan signal output transistor T2.

According to the gate drive unit provided in the present disclosure, the ratio of the channel length of the pull-up control transistor T1 to the channel length of the scan signal output transistor T2 is set to be between 1:8 and 1:12, so that the potential of the pull-up node Q(N), the time required for switching the scan signal from the high potential to the low potential, the charging rate of pixels, and the capacitance and resistance values in the gate drive unit are all in optimal intervals, thereby improving the stability of the gate drive circuit.

In the embodiments of the present disclosure, the channel length of the scan signal output transistor T2 is 1.2 to 2.2 times the channel length of a conventional transistor, that is, the ratio of the channel length of the conventional transistor to the channel length of the scan signal output transistor T2 is between 1:1.2 and 1:2.2. Herein, the channel width of the scan signal output transistor T2 is equal to the channel width of the conventional transistor.

The channel length of a conventional transistor is generally between 10000 microns and 15000 microns, for example, the channel length of a conventional transistor may be 10000 microns, 11000 microns, 12000 microns, 13000 microns, 14000 microns, 15000 microns. Herein, the channel of the conventional transistor includes multiple channels corresponding to a plurality of sub-transistors, for example, one conventional transistor includes 10 sub-transistors, and the channel length of the conventional transistor is equal to the channel length of each sub-transistor multiplied by 10. The channel length of the scan signal output transistor T2 is between 12000 microns and 33000 microns, for example, the channel length of the scan signal output transistor T2 may be 12000 microns, 13000 microns, 14000 microns, 15000 microns, 16000 microns, 17000 microns, 18000 microns, 19000 microns, 20000 microns, 21000 microns, 22000 microns, 23000 microns, 24000 microns, 25000 microns, 26000 microns, 27000 microns, 28000 microns, 29000 microns, 30000 microns, 31000 microns, 32000 microns, 33000 microns. The channel length of the pull-up control transistor T1 is between 1000 microns and 2750 microns. Specifically, the channel length of the pull-up control transistor T1 is one-eighth or one-twelfth of the channel length of the scan signal output transistor T2.

Specifically, a conventional transistor includes a plurality of sub-transistors, each of which includes a sub-channel. For example, if a conventional transistor includes 10 sub-transistors, the channel length of the conventional transistor is equal to the sum of the channel lengths of the 10 sub-channels, and the channel width of the conventional transistor is equal to the sum of the channel widths of the 10 sub-channels.

Figure 3:
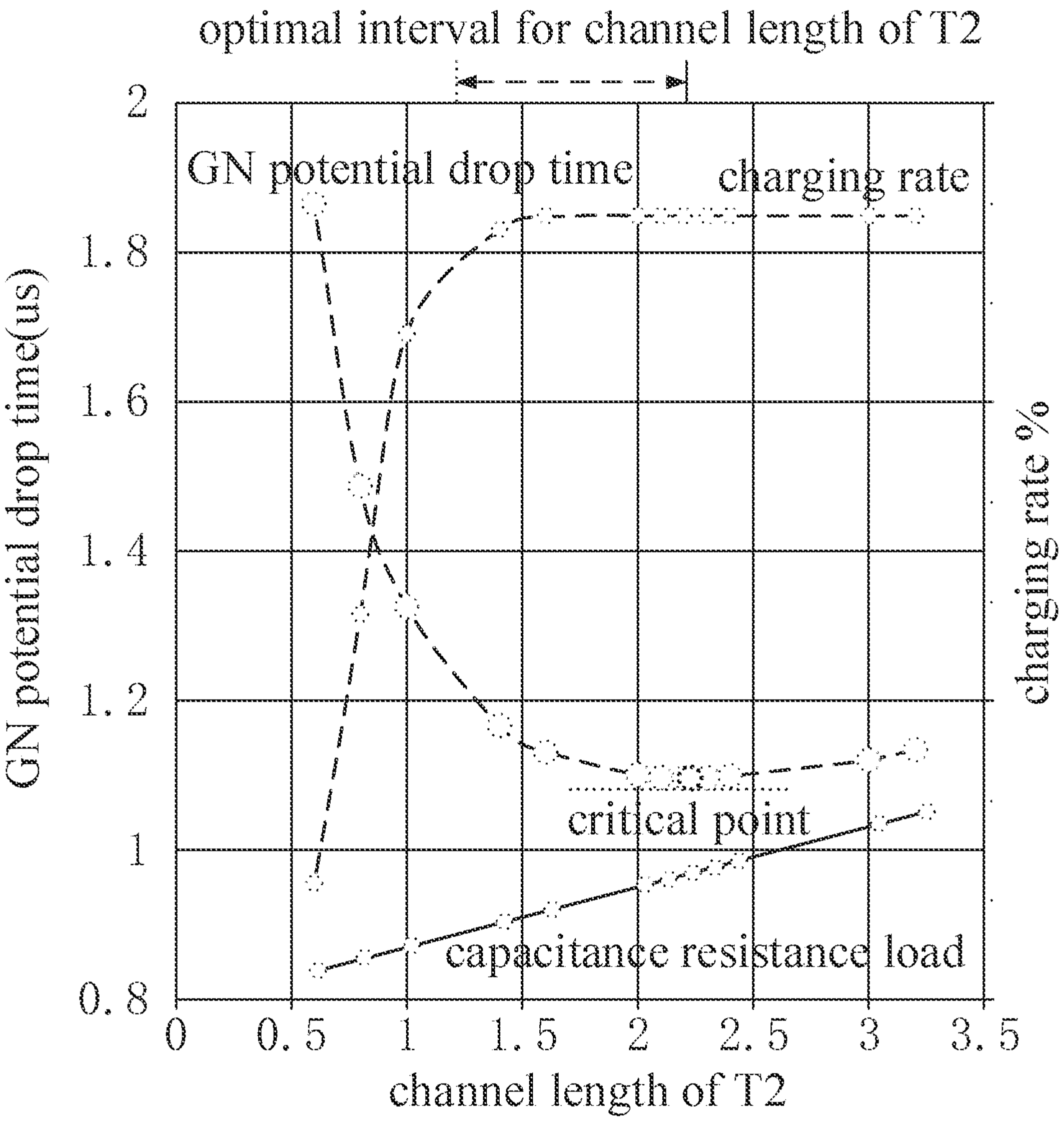
FIG. 3 is a simulation diagram showing an optimal interval of a ratio of a channel length of the scan signal output transistor provided in FIG. 2 to a channel length of a conventional transistor.

As shown in FIG. 3, it is verified that the time t1 required for the present-stage scan signal outputted by the present-stage scan signal output terminal G(N) to switch from the high potential to the low potential when the channel length of the scan signal output transistor T2 is between 1.2 and 2.2 times the channel length of the conventional transistor is less than the time t2 required for the present-stage scan signal to switch from the high potential to the low potential when the channel length of the scan signal output transistor T2 is less than 1.2 times the channel length of the conventional transistor, that is, t1<t2. Alternatively, the time t1 required for the present-stage scan signal outputted by the present-stage scan signal output terminal G(N) to switch from the high potential to the low potential is less than the time t3 required for the present-stage scan signal to switch from the high potential to the low potential when the channel length of the scan signal output transistor T2 is greater than 2.2 times the channel length of the conventional transistor, that is, t1<t3. Meanwhile, the charging rate of the corresponding pixel when the channel length of the scan signal output transistor T2 is between 1.2 and 2.2 times the channel length of the conventional transistor is higher than the charging rate of the corresponding pixel when the channel length of the scan signal output transistor T2 is less than 1.2 times the channel length of the conventional transistor. And the capacitance and resistance load value on the second clock signal input terminal CK(N) electrically connected to the scan signal output transistor T2 when the channel length of the scan signal output transistor T2 is between 1.2 and 2.2 times the channel length of the conventional transistor is smaller than the capacitance and resistance load value on the second clock signal input terminal CK(N) electrically connected to the scan signal output transistor T2 when the channel length of the scan signal output transistor T2 is greater than 2.2 times the channel length of the conventional transistor.

Figure 4A:
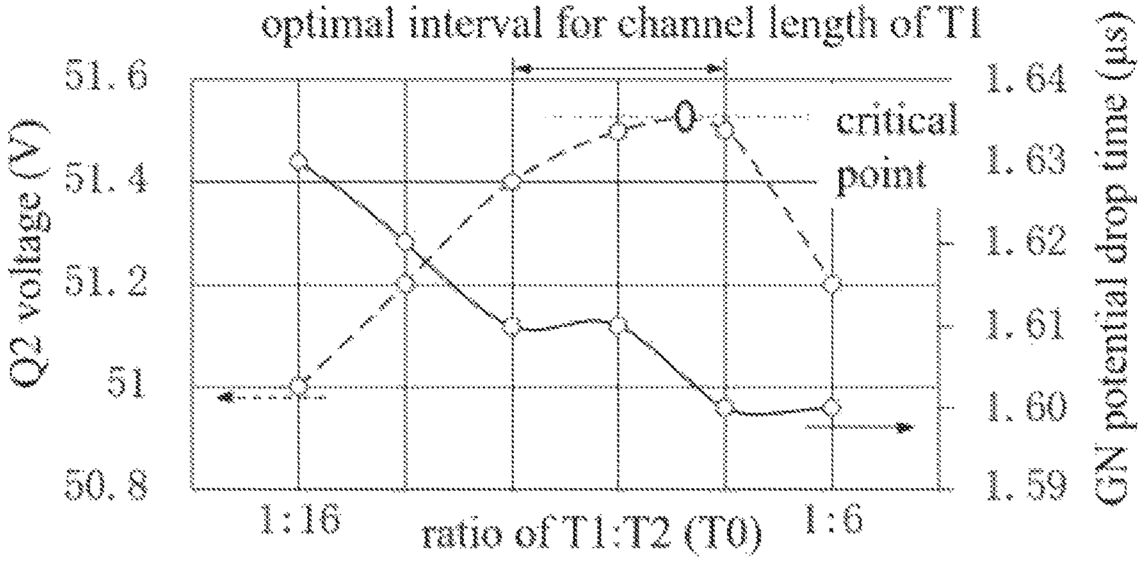
FIG. 4A is a simulation diagram of an optimal interval of a ratio of a channel length of the pull-up control transistor to a channel length of the scan signal output transistor provided in FIG. 2 under normal temperature.
Figure 4B:
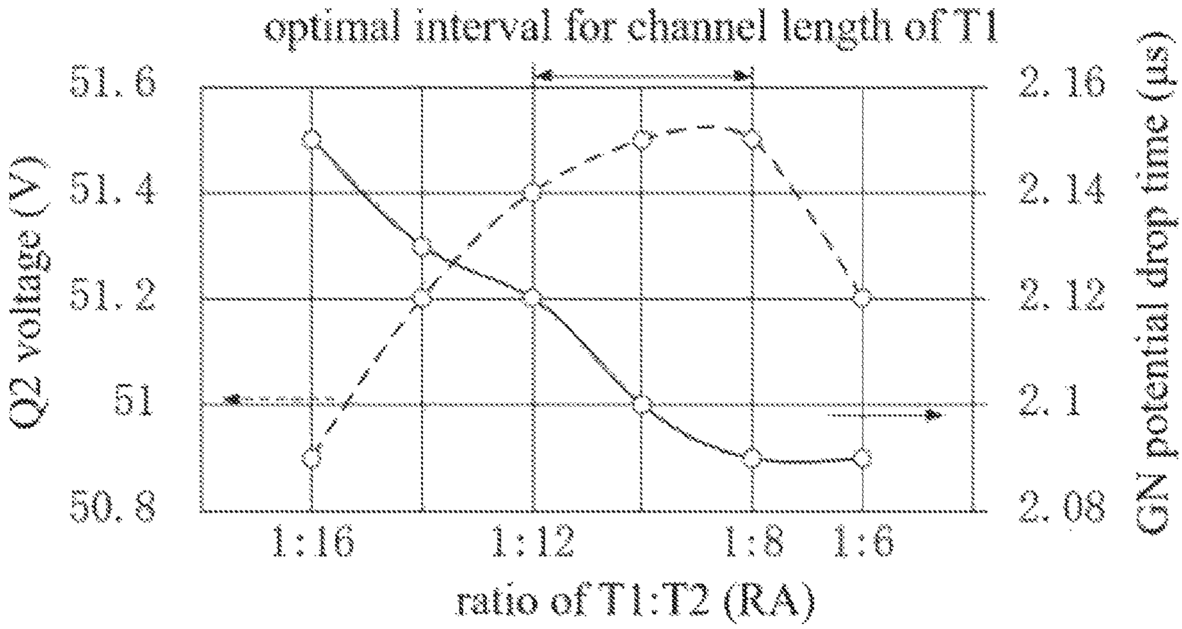
FIG. 4B is a simulation diagram of an optimal interval of a ratio of a channel length of the pull-up control transistor to a channel length of the scan signal output transistor provided in FIG. 2 under high temperature and high humidity.

As shown in FIGS. 4*a* and 4*b*, the imbalance of the parasitic capacitances between the gate of the pull-up control transistor and the first electrode and between the gate of the pull-up control transistor and the second electrode affects the pull-up capability of the pull-up control transistor with respect to the potential of the pull-up node. In the present disclosure, the pull-up capability of the pull-up control transistor with respect to the potential of the pull-up node is improved by adjusting the ratio of the channel lengths of the pull-up control transistor to the scan signal output transistor. Under normal temperature (TO) condition as shown in FIG. 4*a* and high-temperature and high-humidity (RA) condition as shown in FIG. 4*b*, the potential V1 of the pull-up node Q(N) when the ratio of the channel length of the pull-up control transistor T1 to the channel length of the scan signal output transistor T2 is between 1:12 and 1:8 is higher than the potential V2 of the pull-up node Q(N) when the ratio of the channel length of the pull-up control transistor T1 to the channel length of the scan signal output transistor T2 is less than 1:12, that is, V1>V2. The potential V1 of the pull-up node Q(N) when the ratio of the channel length of the pull-up control transistor T1 to the channel length of the scan signal output transistor T2 is between 1:12 and 1:8 is higher than the potential V3 of the pull-up node Q(N) when the ratio of the channel length of the pull-up control transistor T1 to the channel length of the scan signal output transistor T2 is greater than 1:8, that is, V1 is greater than V3. Meanwhile, the time t4 required for the present-stage scan signal outputted by the present-stage scan signal output terminal G(N) to switch from the high potential to the low potential is less than the time t5 required for the present-stage scan signal to switch from the high potential to the low potential when the ratio of the channel length of the pull-up control transistor T1 to the channel length of the scan signal output transistor T2 is less than 1:12, that is, t4<t5. Alternatively, the time t4 required for the present-stage scan signal outputted by the present-stage scan signal output terminal G(N) to switch from the high potential to the low potential is less than the time t6 required for the present-stage scan signal to switch from the high potential to the low potential when the ratio of the channel length of the pull-up control transistor T1 to the channel length of the scan signal output transistor T2 is greater than 1:8, i.e., t4<t6.

Figure 5:
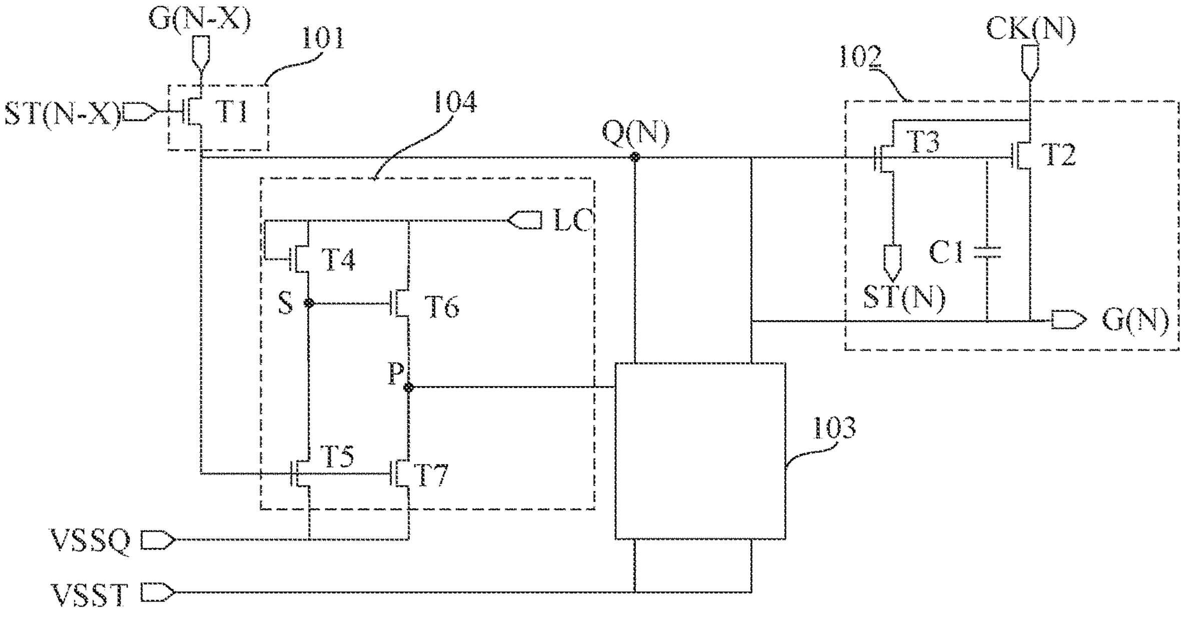
FIG. 5 is one circuit diagram of a pull-down maintain module of the gate drive unit provided in FIG. 1.

As shown in FIG. 5, the pull-down maintain module 104 includes a first pull-down maintain transistor T4, a second pull-down maintain transistor T5, a third pull-down maintain transistor T6, and a fourth pull-down maintain transistor T7.

The gate and the first electrode of the first pull-down maintain transistor T4 are electrically connected to the first clock signal input terminal LC, and the second electrode of the first pull-down maintain transistor T4 is electrically connected to the first electrode of the second pull-down maintain transistor T5.

The gate of the second pull-down maintain transistor T5 is electrically connected to the pull-up node Q(N), and the second electrode of the second pull-down maintain transistor T5 is electrically connected to the second reference low-level signal input terminal VSSQ.

The first electrode of the third pull-down maintain transistor T6 is electrically connected to the first clock signal input terminal LC, the gate of the third pull-down maintain transistor T6 is electrically connected to the second electrode of the first pull-down maintain transistor T4, and the second electrode of the third pull-down maintain transistor T6 is electrically connected to the first electrode of the fourth pull-down maintain transistor T7.

The gate of the fourth pull-down maintain transistor T7 is electrically connected to the pull-up node Q(N), and the second electrode of the fourth pull-down maintain transistor T7 is electrically connected to the second reference low-level signal input terminal VSSQ.

Herein, the first pull-down maintain transistor T4, the second pull-down maintain transistor T5, the third pull-down maintain transistor T6, and the fourth pull-down maintain transistor T7 are configured to keep the potential of the pull-up node Q(N) low.

Herein, the first clock signal inputted by the first clock signal input terminal LC is opposite in phase to the second clock signal inputted by the second clock signal input terminal CK(N).

The ratio of the channel length of the first pull-down maintain transistor T4 to the channel length of the second pull-down maintain transistor T5 is between 1:4 and 1:8. The channel width of the first pull-down maintain transistor T4 is equal to the channel width of the second pull-down maintain transistor T5. Specifically, the ratio of the channel length of the first pull-down maintain transistor T4 to the channel length of the second pull-down maintain transistor T5 includes 1:4, 1:5, 1:6, 1:7, or 1:8.

In the embodiments of the present disclosure, during a turn-on period of the first pull-down maintain transistor T4 and the third pull-down maintain transistor T6, the voltage value between the gate of the third pull-down maintain transistor T6 and the second electrode of the third pull-down maintain transistor T6 is between 24.52 volts and 26.84 volts. Specifically, when the ratio of the channel length of the first pull-down maintain transistor T4 to the channel length of the second pull-down maintain transistor T5 is 1:4, the voltage value between the gate of the third pull-down maintain transistor T6 and the second electrode of the third pull-down maintain transistor T6 is 26.84 volts during the turn-on period of the first pull-down maintain transistor T4 and the third pull-down maintain transistor T6. When the ratio of the channel length of the first pull-down maintain transistor T4 to the channel length of the second pull-down maintain transistor T5 is 1:6, the voltage value between the gate of the third pull-down maintain transistor T6 and the second electrode of the third pull-down maintain transistor T6 is 25.75 volts during the turn-on period of the first pull-down maintain transistor T4 and the third pull-down maintain transistor T6. When the ratio of the channel length of the first pull-down maintain transistor T4 to the channel length of the second pull-down maintain transistor T5 is 1:8, the voltage value between the gate of the third pull-down maintain transistor T6 and the second electrode of the third pull-down maintain transistor T6 is 24.52 volts during the turn-on period of the first pull-down maintain transistor T4 and the third pull-down maintain transistor T6.

In the embodiments of the present disclosure, the ratio of the current value of the second electrode of the fourth pull-down maintain transistor T7 to the current value of the second electrode of the third pull-down maintain transistor T6 is M times the ratio of the difference between the voltage value of the gate of the fourth pull-down maintain transistor T7 and the voltage value of the second electrode of the fourth pull-down maintain transistor T7 to the difference between the voltage value of the gate of the third pull-down maintain transistor T6 and the voltage value of the second electrode of the third pull-down maintain transistor T6, and M is a positive integer greater than 4.

That is, slightly changes in the difference between the voltage value of the gate of the fourth pull-down maintain transistor T7 and the voltage value of the second electrode of the fourth pull-down maintain transistor T7 and the difference between the voltage value of the gate of the third pull-down maintain transistor T6 and the voltage value of the second electrode of the third pull-down maintain transistor T6 may cause an exponential change in the current value of the second electrode of the fourth pull-down maintain transistor T7 and the current value of the second electrode of the third pull-down maintain transistor T6.

Herein, the ratio of the current value of the second electrode of the fourth pull-down maintain transistor T7 to the current value of the second electrode of the third pull-down maintain transistor T6 is much greater than the ratio of the difference between the voltage value of the gate of the fourth pull-down maintain transistor T7 and the voltage value of the second electrode of the fourth pull-down maintain transistor T7 to the difference between the voltage value of the gate of the third pull-down maintain transistor T6 and the voltage value of the second electrode of the third pull-down maintain transistor T6.

In the gate drive circuit provided in the embodiments of the present disclosure, the ratio of the channel length of the first pull-down maintain transistor T4 to the channel length of the second pull-down maintain transistor T5 is set to be between 1:4 and 1:8, so that the potential of the pull-up node, the time required for switching the scan signal from the high potential to the low potential, the charging rate of pixels, and the capacitance and resistance values in the gate driving cell are all in the optimal intervals, thereby improving the stability of the gate drive circuit.

Figure 6:
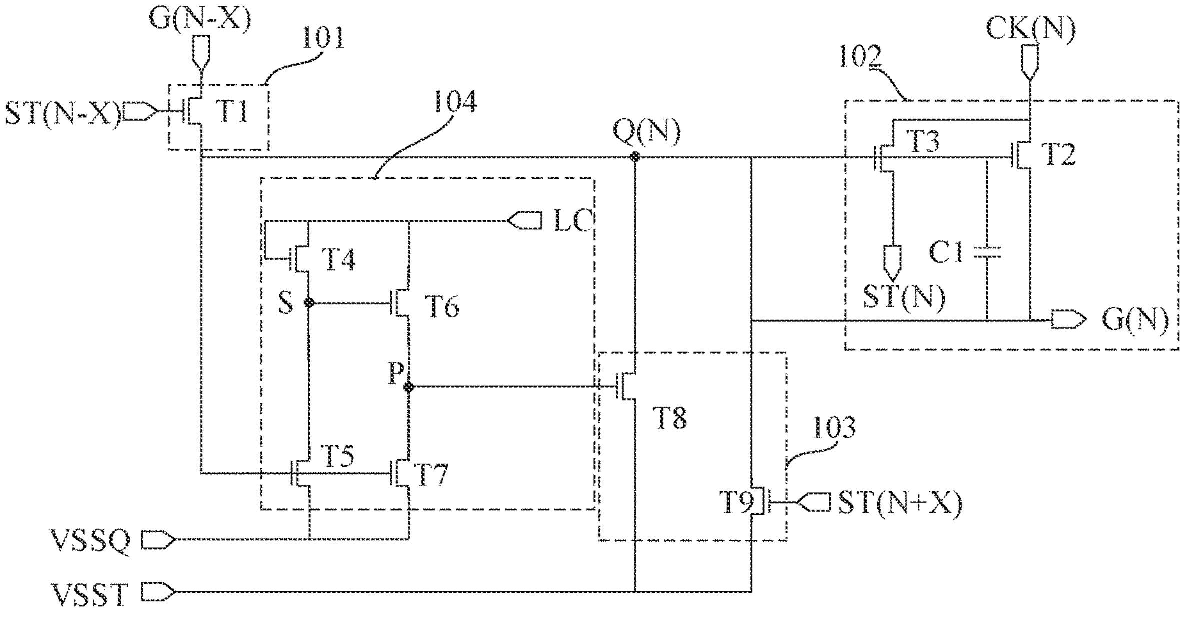
FIG. 6 is one circuit diagram of a pull-down module of the gate drive unit provided in FIG. 1.

As shown in FIG. 6, the pull-down module 103 includes a first pull-down transistor T8 and a second pull-down transistor T9. The first electrode of the first pull-down transistor T8 is electrically connected to the first electrode of the second pull-down transistor T9 and the pull-up node Q(N), the second electrode of the first pull-down transistor T8 is electrically connected to the second electrode of the second pull-down transistor T9 and the first reference low-level signal input terminal VSST, the gate of the first pull-down transistor T8 is electrically connected to the first control signal input terminal, the gate of the second pull-down transistor T9 is electrically connected to the second control signal terminal, and the first pull-down transistor T8 and the second pull-down transistor T9 are configured to pull the potential of the pull-up node Q(N) down. The sum of the channel length of the first pull-down transistor T8 and the channel length of the second pull-down transistor T9 is greater than or equal to the channel length of the pull-up control transistor T1. Herein, the first control signal input terminal is the second electrode of the third pull-down maintain transistor T6, that is, the potential of the second electrode of the third pull-down maintain transistor T6 controls the turn-on and turn-off of the first pull-down transistor T8. The second control signal input terminal is a next-Xth-stage stage-transmission signal output terminal ST(N+X) (where the next-Xth stage represents a stage X stages after the Nth-stage).

Figure 7:
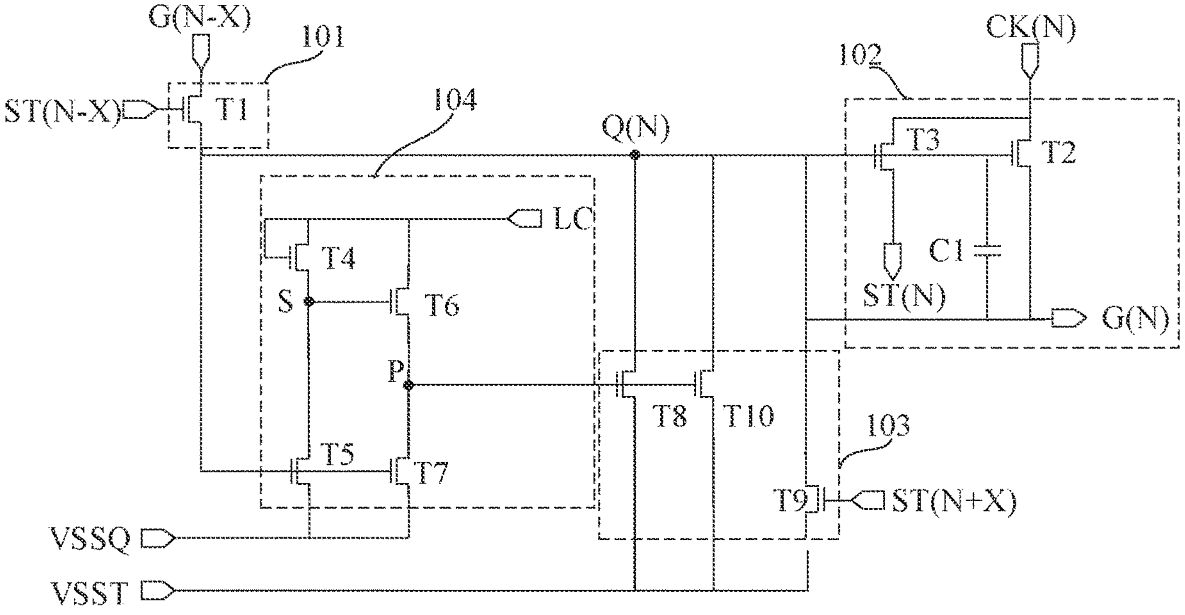
FIG. 7 is another circuit diagram of a pull-down module of the gate drive unit provided in FIG. 1.

As shown in FIG. 7, the pull-down module 103 includes a third pull-down transistor T10, the first electrode of the third pull-down transistor T10 is electrically connected to the first electrode of the second pull-down transistor T9 and the pull-up node Q(N), and the second electrode of the third pull-down transistor T10 is electrically connected to the second electrode of the second pull-down transistor T9 and the first reference low-level signal input terminal VSST. The sum of the channel length of the third pull-down transistor T10 as well as the channel length of the first pull-down transistor T8 and the channel length of the second pull-down transistor T9 is greater than or equal to the channel length of the pull-up control transistor T1. The sum of the channel width of the third pull-down transistor T10 and the channel width of the second pull-down transistor T9 is equal to the channel width of the pull-up control transistor T1.

In the embodiments of the present disclosure, the ratio of the sum of the channel length of the first pull-down transistor T8 and the channel length of the second pull-down transistor T9 to the channel length of the pull-up control transistor T1 is between 1:1 and 1.4:1. Alternatively, the ratio of the sum of the channel length of the first pull-down transistor T8 and the channel length of the third pull-down transistor T10 to the channel length of the pull-up control transistor T1 is between 1:1 and 1.4:1. The sum of the channel width of the first pull-down transistor T8 and the channel width of the second pull-down transistor T9 is equal to the channel width of the pull-up control transistor T1.

Figure 8:
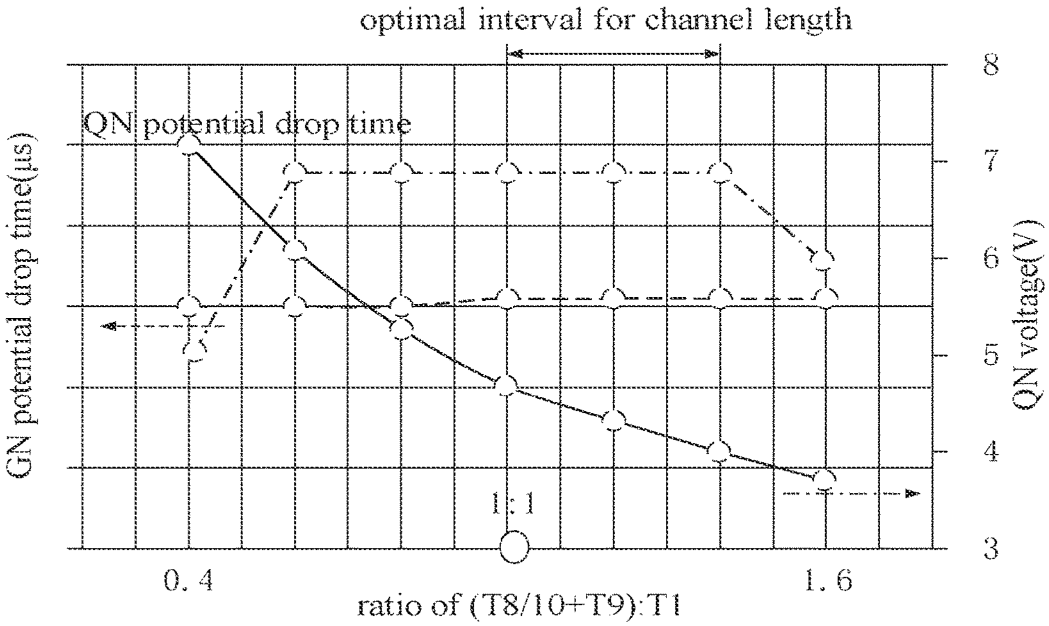
FIG. 8 is a simulation diagram of an optimal interval of a ratio of a channel length of the pull-down transistor to a channel length of the pull-up control transistor provided in FIG. 7.

As shown in FIG. 8, it is verified that when the ratio of the sum of the channel length of the first pull-down transistor T8 and the channel length of the second pull-down transistor T9 to the channel length of the pull-up control transistor T1 is between 1:1 and 1.4:1, during the turn-on period of the first pull-down transistor T8 and the second pull-down transistor T9, the potential of the pull-up node Q(N) is significantly less than that of the pull-up node Q(N) when the ratio of the sum of the channel length of the first pull-down transistor T8 and the channel length of the second pull-down transistor T9 to the channel length of the pull-up control transistor T1 is less than 1:1, that is, the pull-down effect with respect to the potential of the pull-up node Q(N) is better. And the variation in amplitude of the potential of the pull-up node Q(N) is higher than a variation in amplitude of the potential of the pull-up node Q(N) when the ratio of the sum of the channel length of the first pull-down transistor T8 and the channel length of the second pull-down transistor T9 to the channel length of the pull-up control transistor T1 is greater than 1:1.4.

In the gate drive circuit provided in the embodiments of the present disclosure, the ratio of the sum of the channel length of the first pull-down transistor T8 to the channel length of the second pull-down transistor T9 to the channel length of the pull-up control transistor T1 is set to be between 1:1 and 1.4:1. Alternatively, the ratio of the sum of the channel length of the first pull-down transistor T8 and the channel length of the third pull-down transistor T10 to the channel length of the pull-up control transistor T1 is between 1:1 and 1.4:1, so that the potential of the pull-up node, the time required for switching the scan signal from the high potential to the low potential, the charging rate of pixels, and the capacitance and resistance values in the gate drive unit are all in the optimal intervals, thereby improving the stability of the gate drive circuit.

Figure 9:
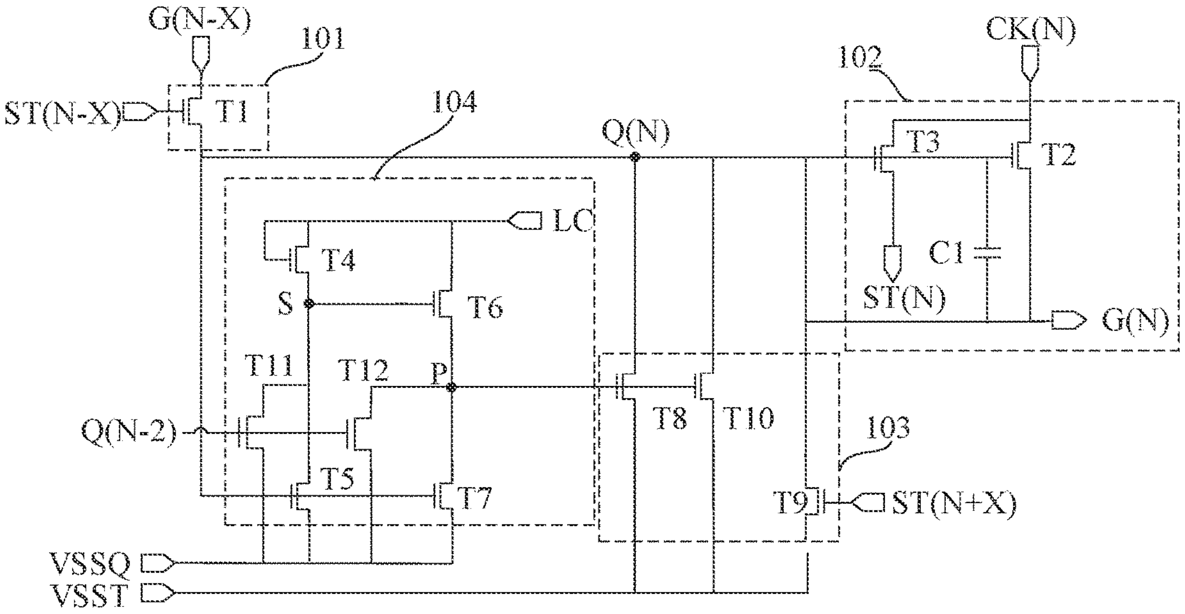
FIG. 9 is another circuit diagram of a pull-down maintain module of the gate drive unit provided in FIG. 1.

As shown in FIG. 9, the pull-down maintain module 104 further includes a fifth pull-down maintain transistor T11 and a sixth pull-down maintain transistor T12. The gate of the fifth pull-down maintain transistor T11 is electrically connected to the pull-up node Q(N) of the pre-Xth-stage gate drive unit, the first electrode of the fifth pull-down maintain transistor T11 is electrically connected to the second electrode of the first pull-down maintain transistor T4, the second electrode of the fifth pull-down maintain transistor T11 is electrically connected to the second reference low-level signal input terminal VSSQ, and X is a positive integer greater than or equal to 1. The gate of the sixth pull-down maintain transistor T12 is electrically connected to the pull-up node Q(N) of the pre-Xth-stage gate drive unit, the first electrode of the sixth pull-down maintain transistor T12 is electrically connected to the second electrode of the third pull-down maintain transistor T6, and the second electrode of the sixth pull-down maintain transistor T12 is electrically connected to the second reference low-level signal input terminal VSSQ. The channel length of the first pull-down maintain transistor T4 is equal to the channel length of the fifth pull-down maintain transistor T11, and the channel length of the second pull-down maintain transistor T5 is equal to the channel length of the sixth pull-down maintain transistor T12. Preferably, the gate of the fifth pull-down maintain transistor T11 is electrically connected to the pull-up node Q(N) of the pre-second-stage gate drive unit.

Herein, the first reference low-level signal input terminal VSST and the second reference low-level signal input terminal VSSQ may be a same signal terminal. Alternatively, the potential of the first reference low-level signal inputted by the first reference low-level signal input terminal VSST is not equal to the potential of the second reference low-level signal inputted by the second reference low-level signal input terminal VSSQ.

In the gate drive circuit provided in the embodiments of the present disclosure, the ratio of the channel length of the first pull-down maintain transistor T4 to the channel length of the second pull-down maintain transistor T5 is set to be between 1:4 and 1:8, and the channel length of the first pull-down maintain transistor T4 is equal to the channel length of the fifth pull-down maintain transistor T11, and the channel length of the second pull-down maintain transistor T5 is equal to the channel length of the sixth pull-down maintain transistor T12, so that the potential of the pull-up node Q(N), the time required for switching the scan signal from the high potential to the low potential, the charging rate of pixels, and the capacitance and resistance values in the gate drive unit are all in the optimal intervals, thereby improving the stability of the gate drive circuit.

The foregoing description of a gate drive circuit and a display panel provided in embodiments of the present disclosure is merely provided to assist in understanding the core idea of the present disclosure, and the foregoing description should not be construed as limiting the scope of protection of the present disclosure.

What is claimed is:

1. A gate drive circuit, wherein the gate drive circuit comprises multi-stage cascaded gate drive units, each gate drive unit comprises a pull-up control module, an output module, a pull-down module, a pull-down maintain module, a first reference low-level signal input terminal, a second reference low-level signal input terminal, and a pull-up node located on a line between the pull-up control module and the output module;

the pull-up control module comprises a pull-up control transistor, the pull-up control transistor is electrically connected to the pull-up node, and the pull-up control transistor is configured to pull a potential of the pull-up node up;

the output module comprises a scan signal output transistor, the scan signal output transistor is electrically connected to the pull-up node, the scan signal output transistor is configured to output a present-stage scan signal under control of the potential of the pull-up node;

the pull-down module is electrically connected to the pull-up node, the first reference low-level signal input terminal, and the pull-up maintain module, and the pull-down module is configured to pull the potential of the pull-up node down to a potential of a first reference low-level signal inputted by the first reference low-level signal input terminal;

the pull-down maintain module is electrically connected to the pull-up node and the second reference low-level signal input terminal, the pull-down maintain module is configured to maintain the potential of the pull-up node at a potential of a second reference low-level signal inputted by the second reference low-level signal input terminal; and wherein a ratio of a channel length of the pull-up control transistor to a channel length of the scan signal output transistor is between 1:8 and 1:12.

2. The gate drive circuit of claim 1, wherein the channel length of the scan signal output transistor is between 12000 microns and 33000 microns.

3. The gate drive circuit of claim 1, wherein the pull-down module comprises a first pull-down transistor and a second pull-down transistor;

a first electrode of the first pull-down transistor is electrically connected to a first electrode of the second pull-down transistor and the pull-up node, a second electrode of the first pull-down transistor is electrically connected to a second electrode of the second pull-down transistor and the first reference low-level signal input terminal, a gate of the first pull-down transistor is electrically connected to a first control signal input terminal, a gate of the second pull-down transistor is electrically connected to a second control signal terminal, and the first pull-down transistor and the second pull-down transistor are configured to pull the potential of the pull-up node down; and a sum of a channel length of the first pull-down transistor and a channel length of the second pull-down transistor is greater than or equal to the channel length of the pull-up control transistor.

4. The gate drive circuit of claim 3, wherein the pull-down module comprises a third pull-down transistor, a first electrode of the third pull-down transistor is electrically connected to the first electrode of the second pull-down transistor and to the pull-up node, and a second electrode of the third pull-down transistor is electrically connected to the second electrode of the second pull-down transistor and to the first reference low-level signal input terminal; and a sum of a channel length of the third pull-down transistor, the channel length of the first pull-down transistor and the channel length of the second pull-down transistor is greater than or equal to the channel length of the pull-up control transistor.

5. The gate drive circuit of claim 4, wherein a ratio of the sum of the channel length of the first pull-down transistor and the channel length of the second pull-down transistor to the channel length of the pull-up control transistor is between 1:1 and 1.4:1; or a ratio of a sum of the channel length of the first pull-down transistor and the channel length of the third pull-down transistor to the channel length of the pull-up control transistor is between 1:1 and 1.4:1.

6. The gate drive circuit of claim 3, wherein a ratio of the sum of the channel length of the first pull-down transistor and the channel length of the second pull-down transistor to the channel length of the pull-up control transistor is between 1:1 and 1.4:1; or a ratio of a sum of the channel length of the first pull-down transistor and the channel length of the third pull-down transistor to the channel length of the pull-up control transistor is between 1:1 and 1.4:1.

7. The gate drive circuit of claim 1, wherein the pull-down maintain module comprises a first pull-down maintain transistor, a second pull-down maintain transistor, a third pull-down maintain transistor, and a fourth pull-down maintain transistor;

a gate and a first electrode of the first pull-down maintain transistor are electrically connected to a first clock signal input terminal, and a second electrode of the first pull-down maintain transistor is electrically connected to a first electrode of the second pull-down maintain transistor;

a gate of the second pull-down maintain transistor is electrically connected to the pull-up node, and a second electrode of the second pull-down maintain transistor is electrically connected to the second reference low-level signal input terminal;

a first electrode of the third pull-down maintain transistor is electrically connected to the first clock signal input terminal, a gate of the third pull-down maintain transistor is electrically connected to a second electrode of the third pull-down transistor, and the second electrode of the third pull-down maintain transistor is electrically connected to a first electrode of the fourth pull-down maintain transistor;

a gate of the fourth pull-down maintain transistor is electrically connected to the pull-up node, a second electrode of the fourth pull-down maintain transistor is electrically connected to the second reference low-level signal input terminal, and the first pull-down maintain transistor, the second pull-down maintain transistor, the third pull-down maintain transistor, and the fourth pull-down maintain transistor are configured to keep the potential of the pull-up node low; and a ratio of a channel length of the first pull-down maintain transistor to a channel length of the second pull-down maintain transistor is between 1:4 and 1:8.

8. The gate drive circuit of claim 7, wherein a ratio of a value of a current flowing through the second electrode of the fourth pull-down maintain transistor to a value of a current flowing through the second electrode of the third pull-down maintain transistor is M times a ratio of a difference between a value of a voltage applied to the gate of the fourth pull-down maintain transistor and a value of a voltage applied to the second electrode of the fourth pull-down maintain transistor to a difference between a value of a voltage applied to the gate of the third pull-down maintain transistor and a value of a voltage applied to the second electrode of the third pull-down maintain transistor, and M is a positive integer greater than 4.

9. The gate drive circuit of claim 7, wherein the pull-down maintain module comprises a fifth pull-down maintain transistor and a sixth pull-down maintain transistor;

a gate of the fifth pull-down maintain transistor is electrically connected to the pull-up node of the gate drive unit which is X stages ahead, a first electrode of the fifth pull-down maintain transistor is electrically connected to the second electrode of the first pull-down maintain transistor, a second electrode of the fifth pull-down maintain transistor is electrically connected to the second reference low-level signal input terminal, and X is a positive integer greater than or equal to 1;

a gate of the sixth pull-down maintain transistor is electrically connected to the pull-up node of the gate drive unit which is X stages ahead, a first electrode of the sixth pull-down maintain transistor is electrically connected to the second electrode of the third pull-down maintain transistor, and a second electrode of the sixth pull-down maintain transistor is electrically connected to the second reference low-level signal input terminal; and the channel length of the first pull-down maintain transistor is equal to a channel length of the fifth pull-down maintain transistor, and the channel length of the second pull-down maintain transistor is equal to a channel length of the sixth pull-down maintain transistor.

10. The gate drive circuit of claim 7, wherein a voltage between the gate of the third pull-down maintain transistor and the second electrode of the third pull-down maintain transistor is between 24.52 volts and 26.84 volts during a turn-on period of the first pull-down maintain transistor and the third pull-down maintain transistor.

11. A display panel comprising a plurality of pixel cells and a gate drive circuit, the gate drive circuit being electrically connected to the plurality of pixel cells, wherein the gate drive circuit comprises multi-stage cascaded gate drive units, each gate drive unit comprises a pull-up control module, an output module, a pull-down module, a pull-down maintain module, a first reference low-level signal input terminal, a second reference low-level signal input terminal, and a pull-up node located on a line between the pull-up control module and the output module;

the pull-up control module comprises a pull-up control transistor, the pull-up control transistor is electrically connected to the pull-up node, and the pull-up control transistor is configured to pull a potential of the pull-up node up;

the output module comprises a scan signal output transistor, the scan signal output transistor is electrically connected to the pull-up node, the scan signal output transistor is configured to output a present-stage scan signal under control of the potential of the pull-up node;

the pull-down module is electrically connected to the pull-up node, the first reference low-level signal input terminal, and the pull-up maintain module, and the pull-down module is configured to pull the potential of the pull-up node down to a potential of a first reference low-level signal inputted by the first reference low-level signal input terminal;

the pull-down maintain module is electrically connected to the pull-up node and the second reference low-level signal input terminal, the pull-down maintain module is configured to maintain the potential of the pull-up node at a potential of a second reference low-level signal inputted by the second reference low-level signal input terminal; and wherein a ratio of a channel length of the pull-up control transistor to a channel length of the scan signal output transistor is between 1:8 and 1:12.

12. The display panel of claim 11, wherein the channel length of the scan signal output transistor is between 12000 microns and 33000 microns.

13. The display panel of claim 11, wherein the pull-down module comprises a first pull-down transistor and a second pull-down transistor;

a first electrode of the first pull-down transistor is electrically connected to a first electrode of the second pull-down transistor and the pull-up node, a second electrode of the first pull-down transistor is electrically connected to a second electrode of the second pull-down transistor and the first reference low-level signal input terminal, a gate of the first pull-down transistor is electrically connected to a first control signal input terminal, a gate of the second pull-down transistor is electrically connected to a second control signal terminal, and the first pull-down transistor and the second pull-down transistor are configured to pull the potential of the pull-up node down; and a sum of a channel length of the first pull-down transistor and a channel length of the second pull-down transistor is greater than or equal to the channel length of the pull-up control transistor.

14. The display panel of claim 13, wherein the pull-down module comprises a third pull-down transistor, a first electrode of the third pull-down transistor is electrically connected to the first electrode of the second pull-down transistor and to the pull-up node, and a second electrode of the third pull-down transistor is electrically connected to the second electrode of the second pull-down transistor and to the first reference low-level signal input terminal; and a sum of a channel length of the third pull-down transistor, the channel length of the first pull-down transistor and the channel length of the second pull-down transistor is greater than or equal to the channel length of the pull-up control transistor.

15. The display panel of claim 13, wherein a ratio of the sum of the channel length of the first pull-down transistor and the channel length of the second pull-down transistor to the channel length of the pull-up control transistor is between 1:1 and 1.4:1; or a ratio of a sum of the channel length of the first pull-down transistor and the channel length of the third pull-down transistor to the channel length of the pull-up control transistor is between 1:1 and 1.4:1.

16. The display panel of claim 14, wherein a ratio of the sum of the channel length of the first pull-down transistor and the channel length of the second pull-down transistor to the channel length of the pull-up control transistor is between 1:1 and 1.4:1; or a ratio of a sum of the channel length of the first pull-down transistor and the channel length of the third pull-down transistor to the channel length of the pull-up control transistor is between 1:1 and 1.4:1.

17. The display panel of claim 11, wherein the pull-down maintain module comprises a first pull-down maintain transistor, a second pull-down maintain transistor, a third pull-down maintain transistor, and a fourth pull-down maintain transistor;

a gate and a first electrode of the first pull-down maintain transistor are electrically connected to a first clock signal input terminal, and a second electrode of the first pull-down maintain transistor is electrically connected to a first electrode of the second pull-down maintain transistor;

a gate of the second pull-down maintain transistor is electrically connected to the pull-up node, and a second electrode of the second pull-down maintain transistor is electrically connected to the second reference low-level signal input terminal;

a first electrode of the third pull-down maintain transistor is electrically connected to the first clock signal input terminal, a gate of the third pull-down maintain transistor is electrically connected to a second electrode of the third pull-down transistor, and the second electrode of the third pull-down maintain transistor is electrically connected to a first electrode of the fourth pull-down maintain transistor;

a gate of the fourth pull-down maintain transistor is electrically connected to the pull-up node, a second electrode of the fourth pull-down maintain transistor is electrically connected to the second reference low-level signal input terminal, and the first pull-down maintain transistor, the second pull-down maintain transistor, the third pull-down maintain transistor, and the fourth pull-down maintain transistor are configured to keep the potential of the pull-up node low; and a ratio of a channel length of the first pull-down maintain transistor to a channel length of the second pull-down maintain transistor is between 1:4 and 1:8.

18. The display panel of claim 17, wherein a ratio of a value of a current flowing through the second electrode of the fourth pull-down maintain transistor to a value of a current flowing through the second electrode of the third pull-down maintain transistor is M times a ratio of a difference between a value of a voltage applied to the gate of the fourth pull-down maintain transistor and a value of a voltage applied to the second electrode of the fourth pull-down maintain transistor to a difference between a value of a voltage applied to the gate of the third pull-down maintain transistor and a value of a voltage applied to the second electrode of the third pull-down maintain transistor, and M is a positive integer greater than 4.

19. The display panel of claim 17, wherein the pull-down maintain module comprises a fifth pull-down maintain transistor and a sixth pull-down maintain transistor;

a gate of the fifth pull-down maintain transistor is electrically connected to the pull-up node of the gate drive unit which is X stages ahead, a first electrode of the fifth pull-down maintain transistor is electrically connected to the second electrode of the first pull-down maintain transistor, a second electrode of the fifth pull-down maintain transistor is electrically connected to the second reference low-level signal input terminal, and X is a positive integer greater than or equal to 1;

a gate of the sixth pull-down maintain transistor is electrically connected to the pull-up node of the gate drive unit which is X stages ahead, a first electrode of the sixth pull-down maintain transistor is electrically connected to the second electrode of the third pull-down maintain transistor, and a second electrode of the sixth pull-down maintain transistor is electrically connected to the second reference low-level signal input terminal; and the channel length of the first pull-down maintain transistor is equal to a channel length of the fifth pull-down maintain transistor, and the channel length of the second pull-down maintain transistor is equal to a channel length of the sixth pull-down maintain transistor.

20. The display panel of claim 17, wherein a voltage between the gate of the third pull-down maintain transistor and the second electrode of the third pull-down maintain transistor is between 24.52 volts and 26.84 volts during a turn-on period of the first pull-down maintain transistor and the third pull-down maintain transistor.

* * * * *